United States Patent [19]

Ariyama et al.

[11] Patent Number: 5,698,010
[45] Date of Patent: Dec. 16, 1997

USOO5698010A

[54] SCRAP MELTING METHOD

[75] Inventors: Tatsuro Ariyama; Takanori Inoguchi; Masahiro Matsuura; Hidetoshi Noda; Takashi Sumigama; Noboru Sakamoto, all of Kawasaki, Japan

[73] Assignee: NKK Corporation, Tokyo, Japan

[21] Appl. No.: 550,364

[22] Filed: Oct. 30, 1995

[30] Foreign Application Priority Data

Nov. 2, 1994 [JP] Japan .................................. 6-269463
Apr. 17, 1995 [JP] Japan .................................. 7-115177

[51] Int. Cl.$^6$ .................................................. C21B 11/00
[52] U.S. Cl. .................................................. 75/573; 75/575
[58] Field of Search .................... 75/581, 573, 575; 266/222, 901

[56] References Cited

U.S. PATENT DOCUMENTS

| 4,921,532 | 5/1990 | Corbett et al. . |
| 5,127,346 | 7/1992 | Kapplinger et al. . |

FOREIGN PATENT DOCUMENTS

| 0 209 880 | 10/1987 | European Pat. Off. . |
| 0 278 221 | 8/1988 | European Pat. Off. . |
| 0 326 403 | 8/1989 | European Pat. Off. . |
| 0 481 955 | 4/1992 | European Pat. Off. . |
| 0 563 828 | 10/1993 | European Pat. Off. . |
| 2 419 165 | 11/1974 | Germany . |
| 195909 | 8/1986 | Japan .................................. 75/581 |
| 1-195225 | 8/1989 | Japan . |
| 1 422 305 | 1/1976 | United Kingdom . |

OTHER PUBLICATIONS

Kamei et al, "Scrapmelting Using a Shaft Type Furnace with Coke Packed Bed Infected with Highly Oxygen Enriched Air and a Large Quantity of Pulverized Coal,", Tetsu to Hagane: Journal of the Iron and Steel Institute of Japan, vol. 79, No. 2, 1993 Tokyo, Japan, pp. 139–146.

Klaus Scheidig, "Hot Metal Production Based On Scrap, Coal And Oxygen", Proceedings of The Eighth Japan-German Seminar, Oct. 6 and 7, 1993, Sendai, Japan, pp. 22–28.

*Primary Examiner*—Melvyn Andrews
*Attorney, Agent, or Firm*—Frishauf, Holtz, Goodman, Langer & Chick, P.C.

[57] ABSTRACT

Provided herein is a scrap melting method capable of both producing a molten iron by efficiently melting scrap and producing a large amount of high calorie exhaust gas having a high utility value as a fuel gas and at the same time capable of performing such operation at a low production cost. Scrap, the source of iron, and coke are charged into a shaft furnace and pulverized coal and oxygen are injected into the furnace from a burner provided at the tuyere portion; in such injection of the pulverized coal and oxygen, the pulverized coal is injected from the center or in the vicinity thereof in diametrical direction of the burner and the oxygen is injected from the surrounding portion thereof to mix the two, thereby rapidly burning the pulverized coal in a combustion zone formed beyond the tuyere; and the scrap is melted by the sensible heat of thus generated combustion gas to produce a molten iron and the combustion gas is collected as a fuel gas without causing a significant post combustion of the combustion gas.

14 Claims, 4 Drawing Sheets

SCRAP MELTING METHOD

BACKGROUND OF THE INVENTION

1. Field of the Invention

The present invention relates to scrap melting method, and more particularly relates to a scrap melting method capable of both producing a molten iron using scrap as the source of iron and obtaining a high calorie exhaust gas having a high utility value as a fuel gas.

2. Description of the Related Art

In recent years, supply of scrap of iron and steel is steadily increasing and more efforts are now directed toward its recycling in view of an effective utilization of resources. For this reason, there is a strong demand for development of a technology for producing a molten iron at a low cost and high productivity by using scrap as the raw material.

While an electric furnace has been used for the production of a molten iron from scrap, the electric furnace method costs high because of a huge amount of electricity required and cannot satisfy the demand in terms of the production cost.

Further, although production of cast iron by a cupola method using scrap as the raw material is practiced, the cupola method requires use of a high quality, large size foundry coke. Since such foundry coke is priced four times or so the blast furnace coke, it is difficult to widely use such method because of the production cost. In order to promote a smooth melting of the scrap, the cupola method requires oxygen in a hot blast introduced from a tuyere not to be quickly consumed by the coke in the race way but causes it to be consumed in the vicinity of a scrap melting zone at an upper portion of the coke bed which is formed at a lower portion of the furnace, so as to achieve a temperature distribution where a highest temperature occurs at such portion. For this reason, the coke to be used must have a low reactivity and be relatively more difficult to be burned comparing to blast furnace coke. It is therefore inevitable to use a special foundry coke which is greater in particle size and lower in reactivity than the blast furnace coke.

In contrast with the above described electric furnace method and cupola method, a scrap melting method has been proposed as using a shaft furnace (TETSU TO HAGANE Vol.79, No.2, P.139–146). Scrap serving as the source of iron and blast furnace coke are charged into the shaft furnace and a combustion thereof is caused by blowing an ordinary temperature oxygen-enriched air and pulverized coal into the furnace from a tuyere portion. The scrap is melted by the sensible heat of the combustion gas and the melting of the scrap is promoted by causing a post combustion of the combustion gas by injecting air from the shaft portion.

Further, another method has been proposed as a scrap melting method (Japanese Patent Laid-Open No.1-195225). A combustion furnace for burning pulverized coal is provided at the outside of a shaft furnace so as to burn a large amount of pulverized coal in this combustion furnace. The generated combustion gas is introduced into the shaft furnace having scrap and coke charged therein, and, at the time of such introduction, an oxygen-containing gas is supplied so that a post combustion of the combustion gas is caused to melt the scrap by the sensible heat of the combustion gas.

It is possible with these proposed scrap melting methods to achieve an economical operation, since pulverized coal is used as a part of heat source and the relatively cheaper blast furnace coke may be used as the coke to be charged into the furnace.

However, both of the above described scrap melting methods are among the techniques directed toward the minimizing of energy based on a low fuel ratio. For this reason, an operation where the fuel ratio is kept low (fuel ratio: 300 kg/t or less) is performed and an oxygen-containing gas such as air is additionally blown into a combustion gas generated by the burning of pulverized coal to cause a post combustion thereof so as to promote the melting of scrap under the low fuel ratio. In other words, aim of these conventional scrap melting methods is to achieve melting of the scrap at a low cost by using the pulverized coal for a reduction of the fuel ratio and as a part of the heat source. Accordingly, they do not intend to obtain a large amount of exhaust gas (fuel gas) by supplying a large amount of pulverized coal to perform an operation at a high fuel ratio and by actively converting the abundantly supplied pulverized coal into a combustion gas. Also, they are not provided with operating conditions and means for making this possible.

Further, while the above described scrap melting methods use the pulverized coal as a part of heat source for reducing the production cost, its supplied amount in terms of the pulverized coal/coke ratio is less than 1 (about 0.9 at the highest). Although the fuel ratio is kept to a low level, it is hardly said that a sufficient cost reduction is achieved in the sense that the ratio of coke to pulverized coal is relatively high.

Furthermore, in these scrap melting methods, the oxygen containing gas such as air is additionally blown into the combustion gas of pulverized coal to cause a post combustion in order to make an operation at a low fuel ratio possible. In addition, since the air or an oxygen enriched air is used for the burning of the pulverized coal and post combustion, the discharged exhaust gas inevitably contains a large amount of nitrogen, $CO_2$, etc. Accordingly, the exhaust gas to be discharged from the furnace in these conventional art scrap melting methods, though has some utility value as a fuel gas, is not a high calorie gas containing a large amount of heat which may be used as the fuel gas for performing a highly effective power generation or as the fuel gas for a heating furnace.

For example, while the document (TETSU TO HAGANE Vol.79, No.2, P.139–146) describing the former of the two conventional arts proclaims that an exhaust gas of higher calorie comparing to the cupola method may be obtained and this is of a utility value as a fuel gas, the calorie of the exhaust gas is only of the order of 2,000 kcal/Nm³ (about 8,400 kJ/Nm³). Also, while the same document shows data of test examples conducted without performing the secondary combustion for the experimental purpose, the result of computation tried by the present inventors, even in this case, shows a calorie of the exhaust gas of only of the order of 2,300 kcal/Nm³ at the highest. Generally, high calorie gases of 2,500 kcal/Nm³ or more are used as the fuel gas for a heating furnace or highly efficient power generation. Thus, the exhaust gas obtained by the conventional art is not suitable for a heating furnace or high-efficiency power generation and is nothing but one of a low utility value. Further, since it is based on the operation at a low fuel ratio, the amount of the generated exhaust gas is small and, from this fact as combined with the low calorie of the exhaust gas, it cannot be regarded as an art capable of steadily supplying a large amount of high quality fuel gas.

Further, with the latter of the two conventional arts (Japanese Patent Laid-Open No.1-195225), the facility cost is high, since it requires a combustion furnace for burning the pulverized coal separately from the melting surface.

Also, it has a problem in view of economy, since some of the sensible heat of the gas is lost in the course of directing the high-temperature gas generated in the combustion furnace to the shaft furnace through a gas pipe.

It should be noted that, while a method of blowing an oxygen-enriched hot air from the tuyere together with pulverized coal (Klaus Scheiding: Proceedings of the Eighth Japan-Germany Seminar, Oct. 6,7, 1993 (Sendai, Japan), p.22 "Hot Metal Production Based on Scrap, Coal and Oxygen") has also been proposed, this method requires use of a relatively large size coke among the blast furnace coke and results in a problem of higher production cost. Further, since this art, similarly to the foregoing conventional arts, does not intend to supply a large amount of pulverized coal to achieve its conversion into a combustion gas and is not provided with operating conditions and means for making it possible. Also, from such facts as that blowing of a hot air containing nitrogen is performed, it is most unlikely to be able to obtain a high calorie exhaust gas.

As described, with the scrap melting techniques which have been proposed, since they are fundamentally directed toward minimizing of energy based on a reduction in the fuel ratio, the amount of heat of the exhaust gas is small and its discharge amount is also small whereby it is of a low utility value. Further, although the pulverized coal is used as a part of heat source, the ratio of pulverized coal in relation to coke cannot be sufficiently increased because an efficient combustion of the pulverized coal cannot be achieved. A sufficient cost reduction based on use of the pulverized coal is not achieved.

SUMMARY OF THE INVENTION

It is an object of the present invention to provide a scrap melting method which is capable of producing a molten iron by efficiently melting scrap, of producing a large amount of high calorie exhaust gas having a high utility value as a fuel gas and of performing a operation at a significantly lower production cost than the conventional arts, considering the utility value of the high calorie exhaust gas.

To attain the object, the present invention provides a scrap melting method comprising the steps of;

charging a scrap and a coke into a shaft furnace having a tuyere means;

injecting a pulverized coal through a pulverized coal injection means and a oxygen gas through an oxygen injection means into the shaft furnace, the pulverized coal injection means being positioned at a center or in a vicinity thereof in a diametrical direction of a burner provided at the tuyere means, the oxygen injection means being positioned outside the pulverized coal injection means in the burner, the pulverized coal and the oxygen gas being mixed and the pulverized coal being combusted to generate a combustion gas; and melting the scrap by a sensible heat of the combustion gas to produce a molten iron, and recovering the combustion gas as a fuel gas without substantially causing post combustion in the shaft furnace.

DESCRIPTION OF THE EMBODIMENTS

Figure 1:
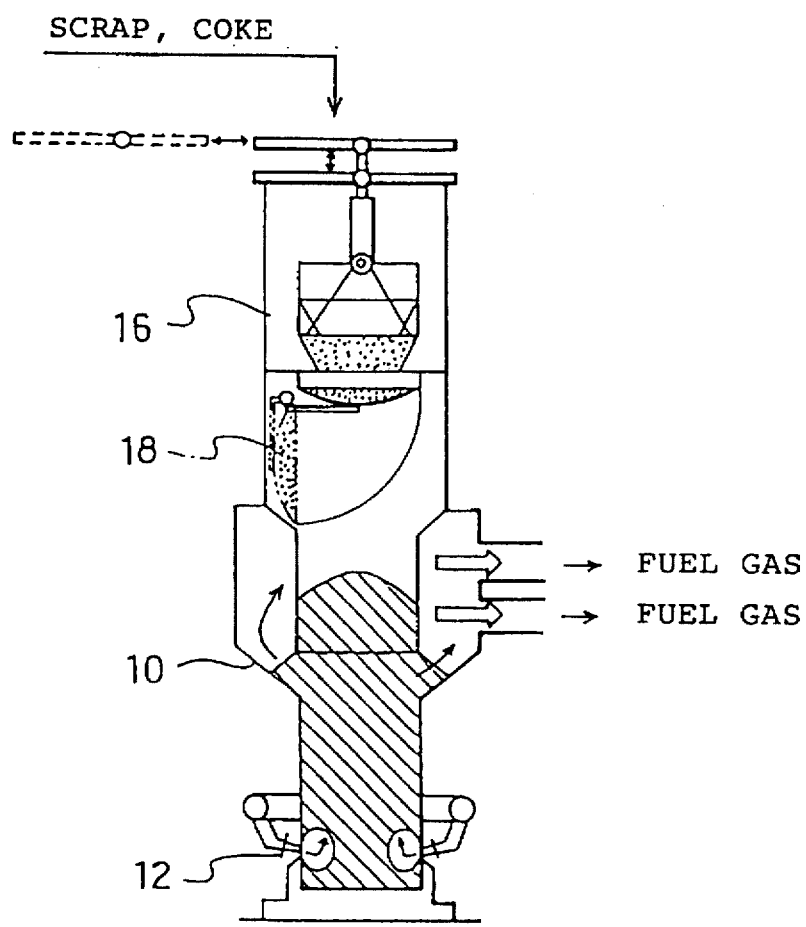
FIG. 1 is a schematic view illustrating a concept of an example of construction of a shaft furnace to be used in the scrap melting method of the present invention.

The present invention is achieved by means of the following (1) to (3) under a high fuel ratio, high pulverized coal ratio operation based on the injection of a large amount of pulverized coal.

(1) Oxygen is injected together with pulverized coal from a burner at a tuyere portion.

(2) The pulverized coal and oxygen are injected by a special method so that the two are brought into contact with each other to be mixed beyond the tuyere, thereby achieving a rapid combustion of the pulverized coal.

(3) A significant post combustion is not allowed of the combustion gas resulting from the burning of the pulverized coal.

A scrap melting method is therefore provided in accordance with the present invention: scrap, serving as the source of iron, and coke are charged into a shaft furnace and pulverized coal and oxygen are injected into the furnace from a burner provided at a tuyere portion; in such injection of the pulverized coal and oxygen, the pulverized coal is injected from the center or in the vicinity thereof in diametrical direction of the burner and the oxygen is injected from the surrounding thereof to mix the two to thereby rapidly burn the pulverized coal in a combustion zone formed beyond the tuyere; and the scrap is melted by the sensible heat of such combustion gas to produce a molten iron; and the combustion gas is collected as a fuel gas without causing a significant post combustion thereof.

In the scrap melting method of the present invention, oxygen may be additionally injected from the inside of the pulverized coal injecting portion in the burner. In such a case, therefore, oxygen is injected from the center or in the vicinity thereof in diametrical direction of the burner, and the pulverized coal is injected from the surrounding thereof which is further surrounded by a portion from which oxygen is injected.

In the present invention, a blast furnace coke may be used as the coke to be charged into the shaft furnace. Further, in the present invention contemplating a large amount of blast of pulverized coal and its efficient combustion, ratio [PC/O$_2$] of the pulverized coal amount PC (kg/hour) to oxygen flow O$_2$ (Nm$^3$/hour) to be injected from the burner is preferably 0.7 kg/Nm$^3$ or more.

Further, in the present invention, a fuel ratio of 300 kg/ton molten iron or more and a weight ratio [pulverized coal ratio/coke ratio] of the pulverized coal ratio (kg/ton molten iron) to coke ratio (kg/ton molten iron) of 1.0 or more are preferred, whereby the scrap may be efficiently melted and a stable production and supply becomes possible of a large amount of high calorie exhaust gas.

In injecting the oxygen in a manner surrounding the pulverized coal from the burner, the oxygen may be injected through an oxygen injecting portion provided as annularly surrounding the circumference of a pulverized coal injecting portion or the oxygen may be injected through a plurality of oxygen injecting portions disposed at suitable intervals around the pulverized coal injecting portion. Further, the injecting position of pulverized coal in the burner may be somewhat deviated from the center of the burner. What is essential is that the pulverized coal is injected from the center or in the vicinity thereof in diametrical direction of the burner and that the oxygen is injected from the surrounding thereof.

Further, also in the method of additionally injecting oxygen from the inside of a pulverized coal injecting portion, the pulverized coal may be injected through the pulverized coal injection portion provided as annularly surrounding the circumference of an oxygen injecting portion or the pulverized coal may be injected through a plurality of pulverized coal injecting portions disposed at suitable intervals around an oxygen injecting portion. The method for injecting the oxygen from the surrounding of the pulverized coal is as described above. Furthermore, the position of the oxygen injecting in the case where an oxygen is injected from the inside of such pulverized coal injecting portion may also be somewhat deviated from the center of the burner.

It should be noted that the present invention does not preclude charging of other sources of iron and/or charge into the furnace besides the scrap.

In order to actively obtain a high calorie exhaust gas during the melting of scrap, a scrap melting method according to the present invention premises performing of an operation where the fuel ratio is increased and the pulverized coal ratio with respect to coke ratio is increased by injecting a large amount of pulverized coal. To efficiently burn the pulverized coal which has been injected into the furnace in a large amount and to reduce the low calorie component in the exhaust gas, oxygen is injected together with the pulverized coal from a burner at the tuyere portion. A special injecting method thereof is used so that the pulverized coal and oxygen are rapidly brought into contact with each other to be mixed beyond the tuyere. Thereby, the injected pulverized coal is rapidly burned just beyond the tuyere to efficiently convert it into a combustion gas. Further, by exhausting the combustion gas to the outside of the furnace without causing its post combustion, melting of the scrap and collecting of the high calorie exhaust gas are achieved at a low cost.

The present invention will now be described in detail.

Scrap serving as the source of iron and coke are charged into a shaft furnace from the top thereof. An ordinary blast furnace coke (normally having a particle size of 20–80 mm) may be used as the coke. The coke charged into the furnace has an effect of holding the scrap filled in the furnace and becomes a part of the heat source for melting the scrap. In the present invention, however, pulverized coal injected through the tuyere is relatively more important as the heat source.

Pulverized coal and oxygen (which may be a cool oxygen) are injected from a burner provided at the tuyere. Since, at that time, the pulverized coal is injected in a manner being surrounded by oxygen around the circumference thereof, an excellent contact between the pulverized coal and oxygen results so that the two are rapidly mixed just beyond the tuyere and the pulverized coal is rapidly burned. Therefore, even if a large amount of pulverized coal per unit amount of oxygen is injected, the pulverized coal is efficiently burned to be converted into a combustion gas. In other words, even if [PC/O$_2$] is increased to a sufficiently high level, the pulverized coal is efficiently converted into a combustion and the amount of pulverized coal exhausted to the outside of the furnace as a dust may be controlled to a very low level.

On the other hand, in the case where the pulverized coal is injected by means of a known lance system (see FIG. 9) or in the case where not only an oxygen gas but also a hot air and/or an oxygen-enriched air are injected, since sufficient contact between the oxygen and pulverized coal is not secured, the pulverized coal cannot be efficiently burned and a mass blowing of pulverized coal (high pulverized coal ratio) cannot be achieved.

By rapid combustion of the pulverized coal injected together with oxygen, a high temperature combustion zone at an temperature about 2,000° C. is formed just beyond the tuyere so that the scrap is melted by such heat and is taken out to the outside of the furnace as a molten iron. A reducing combustion gas generated from the rapid combustion of the pulverized coal moves up through the shaft furnace while pre-heating the scrap by means of the sensible heat thereof and is exhausted from an upper portion of the furnace as an exhaust gas. In the present invention, the combustion gas generated by the burning of the pulverized coal is exhausted from the furnace without significantly causing a secondary combustion thereof. In other words, unlike the conventional arts, a post combustion of the combustion gas by supplying air or an oxygen-enriched air into the shaft portion is not performed.

In the present invention, the gas to be injected through the tuyere portion for the burning is oxygen and, as described, a large amount of pulverized coal per unit amount of oxygen may be efficiently converted into a combustion gas. Further, as described, the combustion gas is not subjected to a secondary combustion. Thereby, a high calorie exhaust gas (2,700 kcal/Nm$^3$ or more) may be obtained, which contains CO and H$_2$ at high percentages (i.e., contains very low percentages of CO$_2$, N$_2$).

In the present invention, since pulverized coal may be burned in an efficient manner, a stable operation is possible even with a level of [PC/O$_2$] at 0.7 kg/Nm$^3$ or more (preferably 1.0 kg/Nm$^3$ or more), and the pulverized coal supplied in a large amount may be efficiently burned to obtain a large amount of high calorie exhaust gas.

In the method where oxygen is additionally injected from the inside of the pulverized coal injecting portion, i.e., in the system where oxygen from the center or in the vicinity thereof in diametrical direction of the burner, pulverized coal from the surrounding thereof and oxygen from a further surrounding thereof are injected, since the pulverized coal is injected in a manner sandwiched by oxygen from the inside and outside thereof, a better contact results between the pulverized coal and oxygen so that the combustion efficiency of the pulverized coal may be further increased. For this reason, the amount of pulverized coal discharged to the outside of the furnace from the top thereof without being burned as a dust may be further reduced.

As described, the present invention premises an increased fuel ratio comparing to the conventional methods and performing of mass injecting of pulverized coal. The aimed range thereof on the actual operation basis is a fuel ratio of 300 kg/t or more and a weight ratio [pulverized coal ratio/coke ratio] of the pulverized coal ratio (kg/t) to coke ratio (kg/t) of 1.0 or more. Thereby, a molten iron may be produced at a high efficiency and it is possible to stably supply a large amount of high calorie exhaust gas as described above. Further, while upper limits of these are determined by operating ratio, fuel cost and required collected gas balance, a fuel ratio of 500 kg/t and [pulverized coal ratio/coke ratio] of about 2.5 are considered as practical upper limits.

As described, since the present invention premises an operation to be performed at a relatively higher fuel ratio comparing to the conventional methods, though fuel cost itself is increased comparing to the conventional methods, a relative reduction in coke ratio on the other hand is possible by using a large amount of pulverized coal which is much more inexpensive than coke. In addition, a high calorie exhaust gas which is of a high utility value may be produced in a large amount. As a total, therefore, its implementation is possible at a significantly lower production/operation cost comparing to the conventional methods.

Further, the simultaneous injection of the pulverized coal and oxygen in a manner such as of the present invention also helps securing of the yield and quality of the molten metal. In other words, when supposing a case where only the coke is charged into the furnace as a heat source and only oxygen is injected through the tuyere, an oxygen zone is formed beyond the tuyere in a manner elongated in a direction of depth so that the molten iron flowing in the vicinity thereof tends to be oxidized. Thus, the iron is transferred into slag as FeO to lower the yield of the iron. Further, suspended oxides in the components of the melt results in a degradation of the quality of the melt. By contrast, in the present invention, the oxidizing zone is adequately small because oxygen is rapidly consumed by the pulverized coal. For this reason, oxidation of the melt as described above is hardly a problem. Further, such effects may be advantageously obtained especially at [PC/$O_2$] of 0.7 kg/$Nm^3$ or more, and more preferably of 1.0 kg/$Nm^3$ or more.

Furthermore, the present invention does not require a special foundry coke such as of the cupola method to control the temperature distribution in the furnace, since the scrap is smoothly melted by a combustion zone formed by rapidly burning the pulverized coal just beyond the tuyere. While the method of the present invention requires coke to form a combustion zone referred to as raceway at a lower portion of the melting zone to hold the charged scrap, a blast furnace coke may be used for this purpose. Since the pulverized coal is rapidly burned within the raceway to rapidly consume oxygen, a reducing atmosphere results within the furnace. Thus, oxidation of the molten iron is effectively controlled so that amount of FeO in slag is extremely small to result a higher yield.

Further, the slag consisting mainly of coal ash generated as a result of conversion into a combustion gas of the pulverized coal is easily melted and is separated from the molten iron at the lower portion of the furnace to be accumulated at an upper part thereof. It may be readily discharged to the outside of the furnace and does not adversely affects the operation.

It should be noted that, in the method of the present invention, in addition to injection of the pulverized coal and oxygen by the burner, a steam, nitrogen, etc., for adjusting the combustion temperature (flame temperature) may be suitably injected through the same burner as a cooling agent. However, in order not to hamper the contact between the pulverized coal and oxygen as described above, such fluid for adjusting the combustion temperature is preferably supplied from a position further outside of the oxygen injecting portion which is disposed around the pulverized coal injecting portion.

In the present invention, while a feasibly highest purity of the oxygen gas to be blown from the burner is preferred, purity of oxygen gases ordinary used for the industrial purpose is higher than 99% (normally, purity of the industrial oxygen gas generally available is of the order of 99.8%~99.9% while purity of the oxygen gas obtained from an oxygen plant of an iron mill is around 99.5%). Purity of this level suffices. Further, considering the effects and advantages to be obtained from the present invention, the combustion efficiency of the pulverized coal is worsened with an oxygen gas having a purity of less than 95%, since a sufficient contact between the pulverized coal and oxygen blown through the tuyere cannot be secured. Further, the low calorie gas components in the exhaust gas are also increased to make it difficult to achieve the objects of the present invention. Accordingly, in the present invention, the oxygen gas to be injected through the tuyere is an oxygen gas having a purity of 95% or higher.

Further, while such as the grain size of the pulverized coal is not specifically limited, a pulverized coal, for example, containing 80% or more having a particle size of 74 μm or less is suitable.

EXAMPLE

FIG. 1 illustrates the conception of an example of construction of a shaft furnace to be employed in a scrap melting method of the present invention. A raw material charging device 16 provided at the top portion of a shaft furnace 10 is constructed such that the interior of the furnace may be isolated from the outside air by a closing device 18 so that a high temperature furnace gas may be completely collected.

Figure 2:
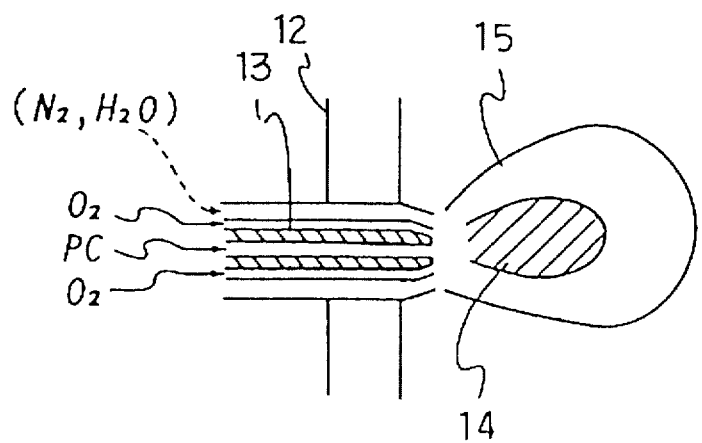
FIG. 2 is an explanatory view illustrating an example of construction of the tuyere portion of the shaft furnace of FIG. 1.

FIG. 2 illustrates an example of construction (in a sectional view) of a tuyere portion 12 of the shaft furnace 10. A burner 13 is provided at the tuyere portion 12. Pulverized coal PC is injected from the center or in the vicinity of the center in diametrical direction of the burner 13 and a cool oxygen $O_2$ is injected from the surrounding thereof whereby the two are rapidly mixed so that the pulverized coal is rapidly burned in a combustion zone 14 formed on the distal end of the tuyere to melt the scrap. At this time, the combustion zone 14 and a raceway 15 are formed as shown in the vicinity of the distal end of the tuyere 12. Further, such as steam or nitrogen for adjusting of the combustion temperature is injected from the burner 13 as a cooling agent into the portion beyond the tuyere.

Figure 3:
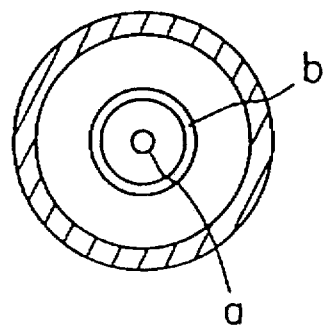
FIG. 3 is an explanatory view illustrating an example of the manner of injecting pulverized coal PC and cool oxygen $O_2$ of the burner shown in FIG. 2 with respect to diametrical direction of the burner.
Figure 4:
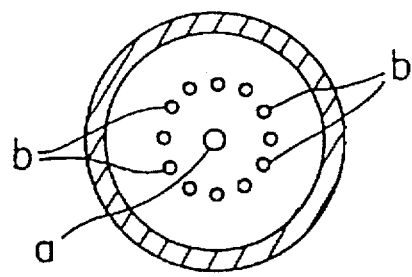
FIG. 4 is an explanatory view illustrating another example of the manner of blowing of pulverized coal PC and cool oxygen $O_2$ of the burner shown in FIG. 2 with respect to diametrical direction of the burner.

FIGS. 3 and 4 illustrate the manner of injecting the pulverized coal PC and cool oxygen $O_2$ in the direction of diameter of the burner. FIG. 3 shows an example of injecting the cool oxygen $O_2$ from an oxygen injecting portion "b" annularly surrounding the circumference of a pulverized coal injecting portion "a". Further, FIG. 4 shows an example where the cool oxygen $O_2$ is injected from a plurality of oxygen injecting portions "b" disposed at suitable intervals around the pulverized coal injecting portion "a". It should be noted that "c" in FIGS. 3 and 4 is a injecting portion for a cooling agent for adjusting the combustion temperature.

Figure 5:
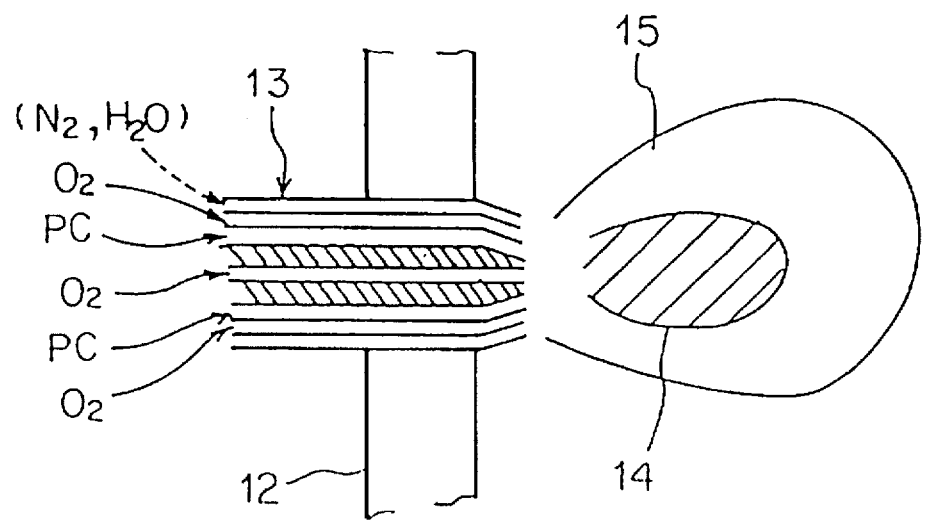
FIG. 5 is an explanatory view illustrating another example of construction of the tuyere portion of the shaft furnace of FIG. 1.

FIG. 5 shows an example of the construction of the tuyere portion 12 (in a sectional view) in a method where oxygen is additionally injected from the inside of the pulverized coal injecting portion. With the burner 13 provided at the tuyere portion 12 in this case, a cool oxygen $O_2$ is injected from the center or in the vicinity of the center in its diametrical direction, and pulverized coal PC is injected from a surrounding thereof which is further surrounded by a portion from which a cool oxygen $O_2$ is injected. In other words, the pulverized coal PC is injected in a manner being sandwiched by cool oxygen $O_2$ from the outer side and inner side thereof, whereby the pulverized coal PC and cool oxygen $O_2$ are rapidly mixed so that the pulverized coal is rapidly burned in the combustion zone 14 formed on the distal end of the tuyere so as to melt the scrap. In this mode, since contact between the pulverized coal PC and the cool oxygen $O_2$ becomes even better, there is an advantage that the combustion efficiency of the pulverized coal is further improved.

Figure 6:
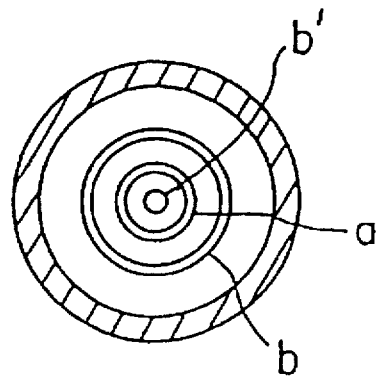
FIG. 6 is an explanatory view illustrating an example of the manner of blowing of pulverized coal PC and cool oxygen $O_2$ of the burner shown in FIG. 5 with respect to diametrical direction of the burner.
Figure 7:
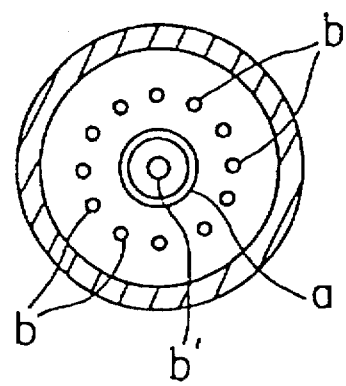
FIG. 7 is an explanatory view illustrating another example of the manner of blowing of pulverized coal PC and cool oxygen $O_2$ of the burner shown in FIG. 5 with respect to diametrical direction of the burner.
Figure 8:
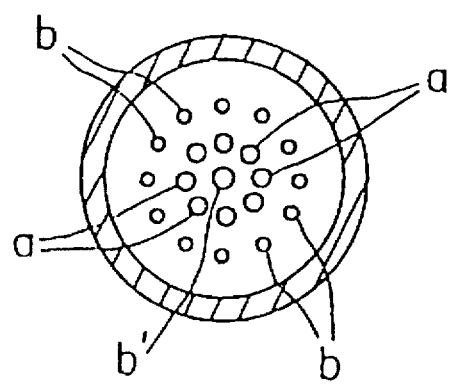
FIG. 8 is an explanatory view illustrating another example of the manner of blowing of pulverized coal PC and cool oxygen $O_2$ of the burner shown in FIG. 5 with respect to diametrical direction of the burner.

FIGS. 6 to 8 illustrate the manner of injection of the pulverized coal PC and cool oxygen $O_2$ in diametrical direction of the burner as shown in FIG. 5. FIG. 6 shows an example where the circumference of an oxygen injecting portion "b'" at the center or in the vicinity of the center in diametrical direction of the burner is surrounded by a pulverized coal injecting portion "a" for injecting pulverized coal PC which is furthermore encircled by an oxygen injecting portion "b" for injecting a cool oxygen $O_2$. Further, FIG. 7 shows an example where the circumference of an oxygen injecting portion "b'" at the center or in the vicinity of the center in diametrical direction of the burner is surrounded by a pulverized coal injecting portion "a" for injecting pulverized coal PC and a cool oxygen $O_2$ is injected from a plurality of oxygen injecting portions "b" disposed at suitable intervals around the pulverized coal injecting portion "a". Furthermore, FIG. 8 shows an example where pulverized coal PC is injected from a plurality of pulverized coal injecting portions "a" disposed at suitable intervals around an oxygen injecting portion "b'" at the center or in the vicinity of the center in diametrical direction of the burner and a cool oxygen $O_2$ is injected from a plurality of oxygen injecting portions "b" disposed at suitable intervals around the pulverized coal injecting portions "a".

Example 1

A scrap melting experimental furnace having a tuyere portion of the structure as shown in FIG. 2 (furnace volume: 2.5 m³, production capacity: 10 t/day) was employed as the furnace body of FIG. 1 and a scrap melting experimental furnace having a tuyere portion of the structure as shown in FIG. 5 (furnace volume: 2.5 m³, production capacity: 10 t/day) was employed as the furnace body of FIG. 1, so that scrap was melted by varying [PC/$O_2$] according to the present invention to produce a molten iron. In the present example, oxygen at an ordinary temperature (cool oxygen) was injected together with pulverized coal from the burner 13 and nitrogen and steam were injected as a cooling agent to adjust the flame temperature (the combustion temperature at the front of the tuyere) to 2,000° C.

Figure 9:
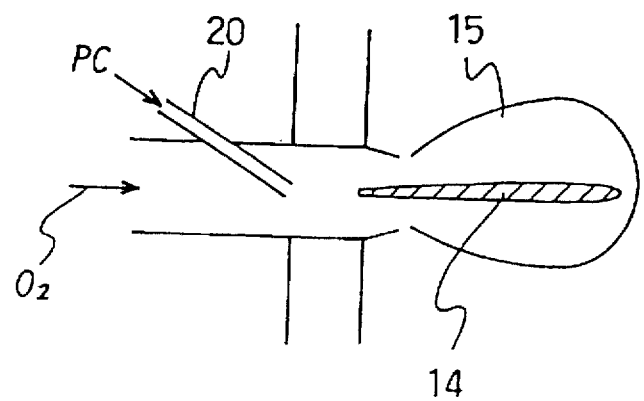
FIG. 9 is a sectional view of a tuyere portion of the conventional system.

Further, as a comparison method, an experimental furnace having a tuyere portion as shown in FIG. 9 was employed as the furnace body of FIG. 1 to melt scrap by varying [PC/$O_2$] to produce a molten iron. FIG. 9 shows a system where pulverized coal is injected through a lance 20 into a hot air enriched with oxygen based on a known cupola method. A hot air at 800° C. was used and [PC/$O_2$] was varied by adjusting the amount of oxygen enrichment and amount of pulverized coal.

It should be noted that, in the present example, a pulverized coal having industrial analysis values as shown in Table 1 of which 75% has a particle size of 74 μm or less is used for the injecting and a blast furnace coke was used as the coke.

TABLE 1

| VM | FC | Ash |
|---|---|---|
| 33.3% | 59.3% | 7.4% |

To see the limit of injecting in the methods of the present invention and the method for comparison, dust in the furnace gas was regularly collected to measure the concentration (%) of C in the dust. The results are shown in FIG. 10.

Figure 10:
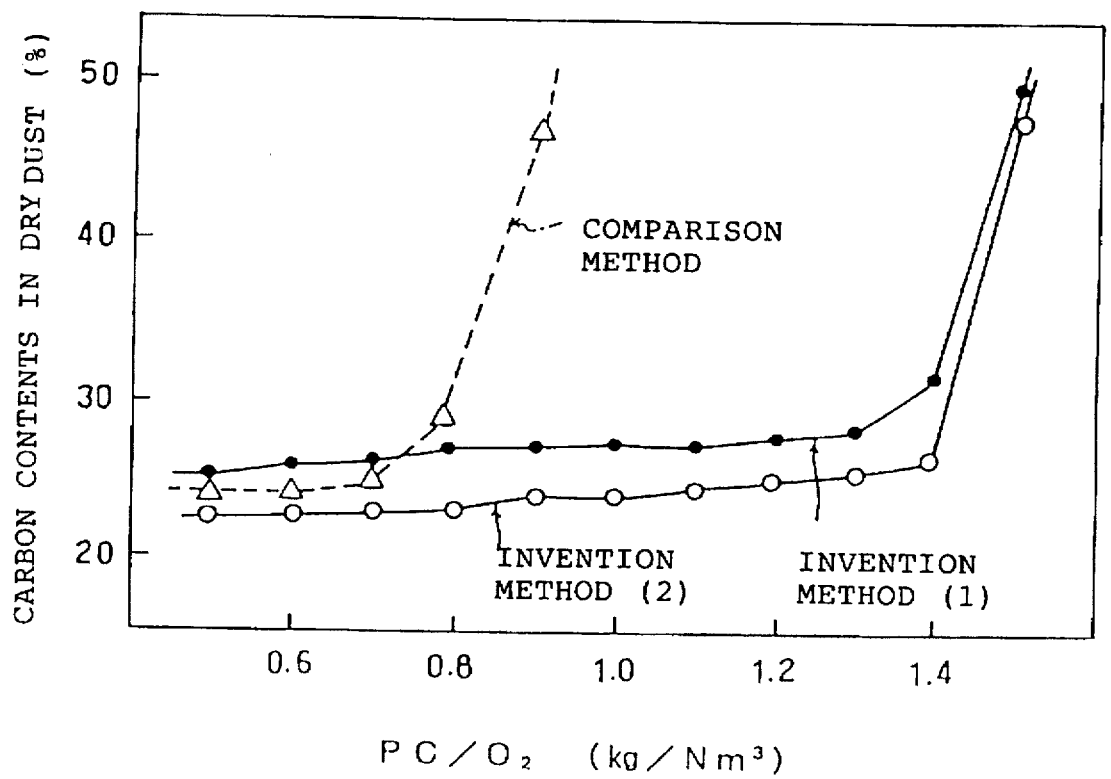
FIG. 10 is a graph showing a relation between the ratio [PC/O2] of the introduced pulverized coal PC (kg/h) to oxygen flow $O_2$ ($Nm^3/h$) and a concentration of C in a dry dust in a furnace top gas according to the present invention.

FIG. 10 shows the relation between the ratio [PC/$O_2$] of the introduced pulverized coal amount PC (kg/hour) to oxygen flow $O_2$ (Nm³/hour) and the concentration of C in the dry dust at the top of the furnace. In the method for comparison, the C concentration in the furnace dust rapidly increases when the value of [PC/$O_2$] has exceeded 0.7 kg/Nm³. This indicates the fact that, when [PC/$O_2$] is in such region, the pulverized coal is not sufficiently burned just beyond the tuyere and is discharged from the top of the furnace in its unburned state, i.e., the blown pulverized coal is not fully used as fuel.

On the other hand, in the method (1) of the present invention, the concentration in the dry furnace gas is kept low up to the vicinity of [PC/$O_2$] at 1.4 kg/Nm³ whereby it is seen that, even when the pulverized coal was injected in a large amount, it is efficiently burned and is converted into a combustion gas within the furnace. Further, in the method (2) of the present invention according to the system of FIG. 5, it is seen that the pulverized coal is burned even more efficiently. It should be noted that [PC/$O_2$] stoichiometrically has an upper limit substantially at 1.4 kg/Nm³ and the fact that the C concentration in the dry furnace gas is increased steeply in the vicinity of [PC/$O_2$] at 1.4 kg/Nm³ does not indicate a limitation of the present invention.

As is apparent from the present example, since, in accordance with the present invention, the pulverized coal and oxygen injected through the tuyere portion are rapidly mixed beyond the tuyere so that the pulverized coal is rapidly burned, it is possible to efficiently burn the pulverized coal to convert it into a combustion gas even when [PC/$O_2$] is at a sufficiently high level. Further, it was confirmed that the methods of the present invention did not cause any problem also with respect to the melting of scrap and the production of molten iron.

Example 2

An experimental furnace having a tuyere portion as shown in FIG. 2 and an experimental furnace having a tuyere portion as shown in FIG. 9 which are the same as those in Example 1 are respectively used to melt scrap to produce a molten iron. Pulverized coal and coke similar to those in Example 1 were used. Further, in this Example, air for post combustion was introduced into the shaft portion to cause a post combustion of the combustion gas in some of the comparison examples. Production conditions of each example and the result thereof are shown in Tables 2 and 3.

Further, when Tables 2 and 3 are referred, the following should be noted;

"all coke" means that coke is charged without pulverized coal injection. "PCI" means pulverized coal injection with charge of coke. In cases of 6 through 11, "Oxygen" through tuyere is given by amount of oxygen for enriching air. "Steam" and "Water" each is used for adjusting the combustion temperature.

In Tables 2 and 3, Cases 2 to 4 are examples of the present invention and all the rest are comparison examples. Further, in all the operation examples except Case 1, injection of the pulverized coal through the tuyere portion is performed. Further, Cases 1 to 4 and 8 to 11 are the examples using an experimental furnace having the tuyere portion as shown in FIG. 2, and Cases 5 to 7 are the examples using an experimental furnace having the tuyere portion (injection of pulverized coal by a lance system) as shown in FIG. 9. In either case, flame temperature (temperature at the distal end of the tuyere) is kept constant at 2,200° C.

In the present example, no problem was caused in operation itself in any of the cases.

Case 1 is an operation example where pulverized coal was not injected (only oxygen was injected from the tuyere) so that the heat source was entirely provided by coke (pulverized coal ratio: 0); on the other hand, Cases 2, 3, 4 were operation examples of injecting pulverized coal from a burner together with oxygen where the pulverized coal ratio was increased in order of Cases 2, 3, 4.

In Case 1 where the injection of pulverized coal is not performed, FeO in slag is increased due to the fact that the oxidizing zone within the raceway is expanded, causing a lower quality and lower yield of the molten iron. Further, since the heat source in Case 1 is entirely provided by coke, the production cost is inevitably high.

In Case 2, while the injection of pulverized coal is performed, since [PC/O$_2$] is low, FeO in slag is high though not as high as in Case 1. Further, in this operation example, the [pulverized coke ratio]/[coke ratio] is of the order of 0.35 and the coke ratio is relatively high to result a problem of production cost.

By contrast, in Cases 3 and 4 which are preferred examples of the present invention, FeO in slag is low to result an excellent quality and yield of the molten iron. Further, in Cases 3 and 4, combustion of pulverized coal is efficiently performed despite the fact that a large amount of pulverized coal exceeding the coke ratio is injected, a large amount of high calorie exhaust gas of 2,700 kcal/Nm$^3$ or more is obtained.

Case 5 is an operation example where a conventional blowing tuyere (see FIG. 9) is used to blow a pulverized coal and oxygen. Since the combustion efficiency of the pulverized coal is low, a higher [PC/O$_2$] cannot be achieved. For this reason, a large amount of coke in relation to the pulverized coal is required to result a high production cost. Further, since contact between the pulverized coal and oxygen beyond the tuyere is not sufficiently secured, FeO in slag is high to result a low quality and low yield of the molten iron.

Case 6 is an operation example where a conventional injecting tuyere (see FIG. 9) is used to blow an oxygen-enriched air together with pulverized coal. In this operation example, since, in addition to use of the conventional type injecting tuyere, the oxygen-enriched air is used as the injecting gas, a sufficient contact between the oxygen and pulverized coal cannot be secured. For this reason, the combustion efficiency is even lower than that in Case 5. Accordingly, since the coke ratio must be increased, the production cost is higher. Further, since the oxygen-enriched air (66% O$_2$) is used, the calorie of the exhaust gas is also low (less less 2,500 kcal/Nm$^3$). Furthermore, since, as described, contact between the oxygen and pulverized coal cannot be sufficiently secured, FeO in slag is high to result a lower quality and lower yield of the molten iron.

Case 7 is an operation example where a conventional blowing tuyere (see FIG. 9) is used to inject an oxygen-enriched air together with pulverized coal and air for secondary combustion is introduced into the shaft portion. In this operation example, though the fuel ratio may be made lower, the combustion efficiency of the pulverized coal is low for a similar reason as in Case 6. Since the coke ratio is high, the production cost is high. Further, since an oxygen-enriched air (66% O$_2$) is used and a combustion gas generated by the burning of the pulverized coal is subjected to a post combustion, the calorie of the combustion gas is very low (less than 1,800 kcal/Nm$^3$). Furthermore, since contact between the oxygen and pulverized coal is not sufficiently secured similarly as in Case 6, FeO in slag is high to result a low quality and low yield of the molten iron.

Case 8 is an operation example where a tuyere injecting system corresponding to the method of the present invention is employed and an oxygen-enriched air is injected from the surrounding of pulverized coal. In this operation example, since an oxygen-enriched air is used as the injecting gas, a sufficient contact between oxygen and air cannot be secured. For this reason, the combustion efficiency of the pulverized coal is low. Accordingly, since the coke ratio must be increased, a high production cost results. Further, since an oxygen-enriched air (69% O$_2$) is used, the calorie of the combustion gas is also low (less than 2,400 kcal/Nm$^3$). Furthermore, since a sufficient contact between oxygen and pulverized coal cannot be secured due to use of the oxygen-enriched air, FeO in slag is higher comparing to Cases 3 and 4 to result a lower quality and lower yield of the molten iron.

Case 9 is an operation example where a tuyere injecting system corresponding to the method of the present invention is employed and an oxygen-enriched air is injected from the surrounding of pulverized coal and air for post combustion is introduced into the shaft portion. In this operation example, although the fuel ratio may be made lower comparing to that in Case 8, the combustion efficiency of the pulverized coal is low for a similar reason as in Case 8. Since the coke ratio is thus high, the production cost is high. Further, since an oxygen-enriched air (62% O$_2$) is used and the combustion gas generated by the burning of pulverized coal is subjected to a post combustion, the calorie of the combustion gas is very low (less than 1,800 kcal/Nm$^3$). Furthermore, since a sufficient contact between oxygen and pulverized coal cannot be secured similarly as in Case 8, FeO in slag is higher comparing to Cases 3 and 4 to result a lower quality and lower yield of the molten iron.

Cases 10 and 11 are operation examples at a low fuel ratio. Case 10 is an operation example where a tuyere injecting system corresponding to the method of the present invention is employed and an oxygen-enriched air is blown from the surrounding of pulverized coal. In this operation example, since an oxygen-enriched air is used as the injecting gas, a sufficient contact between oxygen and air cannot be secured. For this reason, the combustion efficiency of the pulverized coal is low. Accordingly, since the coke ratio must be increased, a high production cost results. Further, since an oxygen-enriched air (63% $O_2$) is used, the calorie of the combustion gas is also low (less than 2,300 kcal/$Nm^3$). Furthermore, since this is an operation at a low fuel ratio, the amount of exhaust gas is also small. Moreover, since a sufficient contact between oxygen and pulverized coal cannot be secured due to use of the oxygen-enriched air, FeO in slag is higher comparing to Cases 3 and 4 to result a lower quality and lower yield of the molten iron.

Case 11 is an operation example where a tuyere injecting system corresponding to the method of the present invention is employed and an oxygen-enriched air is blown from the surrounding of pulverized coal and air for post combustion is introduced into the shaft portion. In this operation example, although the fuel ratio may be made lower comparing to that in Case 10, the combustion efficiency of the pulverized coal is low for a similar reason as in Case 10. Since the coke ratio is thus high, the production cost is high. Further, since an oxygen-enriched air (63% $O_2$) is used and the combustion gas generated by the burning of pulverized coal is subjected to a post combustion, the calorie of the combustion gas is very low (less than 1,800 kcal/$Nm^3$). Furthermore, since this is an operation at a low fuel ratio, the amount of exhaust gas is also small. Moreover, since a sufficient contact between oxygen and pulverized coal cannot be secured similarly as in Case 10, FeO in slag is higher comparing to Cases 3 and 4 to result a lower quality and lower yield of the molten iron.

As is apparent from the above examples, in order to achieve a low-cost operation by efficiently melting scrap and by obtaining a large amount of high calorie exhaust gas under an operation based on a high fuel ratio and high pulverized coal ratio, it is necessary to meet all the conditions of the method of the present invention: (1) oxygen is injected together with pulverized coal from a burner at a tuyere portion; (2) a rapid burning of the pulverized coal is achieved by injecting the pulverized coal and oxygen in a special method so that the two are quickly brought into contact with each other to be mixed just beyond the tuyere; and (3) a significant post combustion is not allowed of the combustion gas which occurs due to the burning of the pulverized coal.

As has been described above, according to the present invention, it is possible not only to efficiently produce a molten iron by melting scrap but also to obtain a large amount of high calorie exhaust gas having a high utility value as fuel gas. In addition, an inexpensive pulverized coal obtained by pulverizing an ordinary coal may be used as a main heat source. Since [$PC/O_2$] may be made higher, a large amount of pulverized coal may be converted into a combustion gas by a small amount of oxygen. The invention may be implemented by means of a simple facility. Based on these, production of a molten metal and production of a high calorie fuel gas using scrap and pulverized coal as the raw material may be implemented at a low cost. Especially considering the fact that the pulverized coal ratio may be made higher and a large amount of high calorie exhaust gas having a high utility value may be produced, there is an excellent advantage that its implementation is possible at significantly lower production/operation costs comparing to the conventional art.

TABLE 2

| | Items | Case 1 all coke | Case 2 PCI | Case 3 PCI | Case 4 PCI | Case 5 PCI |
|---|---|---|---|---|---|---|
| Burden and Pulverized Coal | Coke Ratio (kg/t) | 540 | 334 | 194 | 106 | 298 |
| | Pulverized Coal Ratio (kg/t) | — | 120 | 207 | 262 | 155 |
| | Converter Slag Ratio (kg/t) | 120 | 120 | 120 | 120 | 121 |
| | Silica Stone Ratio (kg/t) | — | — | 4 | 7 | 6 |
| | Lime Stone Ratio (kg/t) | 20 | 3 | — | — | — |
| Tuyere | Oxygen ($Nm^3/t$) | 293 | 241 | 208 | 188 | 221 |
| | Air ($Nm^3/t$) | — | — | — | — | — |
| | Steam (kg/t) | 171 | 98 | 48 | 17 | 73 |
| | Water (kg/t) | — | — | — | — | — |
| | Flame Temperature (°C.) | 2200 | 2200 | 2200 | 2200 | 2200 |
| | $PC/O_2$ (kg/$Nm^3$) | — | 0.50 | 1.00 | 1.40 | 0.70 |
| | Post-Combustion Air ($Nm^3/t$) | None | None | None | None | None |
| Furnace Top | Top Gas Temperature (°C.) | 250 | 250 | 250 | 250 | 250 |
| | Exhaust Gas ($Nm^3/t$) | 1046 | 840 | 712 | 635 | 734 |
| | Exhaust Gas Component | | | | | |
| | CO (%) | 76.7 | 74.5 | 72.1 | 70.1 | 75.5 |
| | $CO_2$ (%) | 0.3 | 0.1 | — | — | — |
| | $H_2$ (%) | 22.5 | 22.9 | 23.3 | 23.5 | 21.8 |
| | $N_2$ (%) | 0.5 | 2.5 | 4.6 | 6.4 | 2.7 |
| | Calorie of Exhaust Gas (kcal/$Nm^3$) | 2890 | 2837 | 2775 | 2721 | 2840 |
| Slag | Slag Ratio (kg/t) | 134 | 117 | 114 | 115 | 122 |
| | FeO in Slag (%) | 7.0 | 5.2 | 1.9 | 0.9 | 4.3 |
| | (CaO + MgO)/$SiO_2$ in Slag | 1.1 | 1.1 | 1.1 | 1.1 | 1.1 |
| | Slag Temperature (°C.) | 1530 | 1535 | 1550 | 1540 | 1515 |
| | Molton Iron Temperature (°C.) | 1470 | 1490 | 1515 | 1520 | 1480 |

TABLE 3

|  | Items | Case 6 PCI | Case 7 PCI | Case 8 PCI | Case 9 PCI | Case 10 PCI | Case 11 PCI |
| --- | --- | --- | --- | --- | --- | --- | --- |
| Burden and Pulverized Coal | Coke Ratio (kg/t) | 322 | 275 | 212 | 184 | 150 | 125 |
|  | Pulverized Coal Ratio (kg/t) | 140 | 131 | 198 | 175 | 140 | 115 |
|  | Converter Slag Ratio (kg/t) | 124 | 110 | 121 | 113 | 97 | 95 |
|  | Silica Stone Ratio (kg/t) | 5 | 5 | 5 | 6 | 4 | 4 |
|  | Lime Stone Ratio (kg/t) | — | — | — | — | — | — |
| Tuyere | Oxygen (Nm$^3$/t) | 174 | 142 | 175 | 148 | 147 | 122 |
|  | Air (Nm$^3$/t) | 131 | 105 | 113 | 133 | 131 | 107 |
|  | Steam (kg/t) | 39 | 26 | 18 | 10 | 23 | 20 |
|  | Water (kg/t) | — | — | — | — | — | — |
|  | Flame Temperature (°C.) | 2200 | 2200 | 2200 | 2200 | 2200 | 2200 |
|  | PC/O$_2$ (kg/Nm$^3$) | 0.70 | 0.80 | 1.00 | 1.00 | 0.81 | 0.80 |
|  | Post-Combustion Air (Nm$^3$/t) | None | 100 | None | 100 | None | 75 |
| Furnace Top | Top Gas Temperature (°C.) | 250 | 285 | 250 | 285 | 185 | 225 |
|  | Exhaust Gas (Nm$^3$/t) | 704 | 687 | 673 | 687 | 610 | 561 |
|  | Exhaust Gas Component |  |  |  |  |  |  |
|  | CO (%) | 67.0 | 48.6 | 64.2 | 48.4 | 64.0 | 48.0 |
|  | CO$_2$ (%) | 0.1 | 10.1 | — | 10.4 | — | 10.7 |
|  | H$_2$ (%) | 18.1 | 11.7 | 16.4 | 11.6 | 12.9 | 11.1 |
|  | N$_2$ (%) | 14.8 | 29.6 | 19.4 | 29.6 | 23.1 | 30.2 |
|  | Calorie of Exhaust Gas (kcal/Nm$^3$) | 2489 | 1768 | 2360 | 1759 | 2264 | 1735 |
| Slag | Slag Ratio (kg/t) | 119 | 113 | 104 | 100 | 94 | 84 |
|  | FeO in Slag (%) | 4.5 | 4.7 | 2.3 | 2.4 | 2.3 | 2.5 |
|  | (CaO + MgO) in Slag | 1.1 | 1.1 | 1.1 | 1.1 | 1.1 | 1.1 |
|  | Slag Temperature (°C.) | 1550 | 1550 | 1545 | 1550 | 1535 | 1530 |
|  | Molton Iron Temperature (°C.) | 1505 | 1515 | 1520 | 1515 | 1490 | 1490 |

What is claimed is:

1. A scrap melting method comprising the steps of:
   charging scrap and coke into a shaft furnace from a top of the shaft furnace, said shaft furnace including a tuyere means having a burner;
   injecting pulverized coal through a pulverized coal injection means and an oxygen gas through an oxygen injection means into the shaft furnace to form a combustion zone in front of the tuyere means, the pulverized coal injection means being positioned inside the oxygen injection means in a diametrical direction of the burner, the pulverized coal and the oxygen gas being mixed and the pulverized coal being combusted in the combustion zone to generate a combustion gas; and
   melting the scrap by a sensible heat of the combustion gas to produce molten iron, and recovering the combustion gas as a fuel gas without substantially causing post combustion in the shaft furnace.

2. The scrap melting method of claim 1, wherein said burner has a second oxygen injection means inside of the pulverized coal injection means, the oxygen being injected through the oxygen injection means outside the pulverized coal injection means and the second oxygen injection means.

3. The scrap melting method of claim 2, wherein the pulverized coal injection is carried out through the pulverized coal injection means surrounding the second oxygen injection means.

4. The scrap melting method of claim 2, wherein the pulverized coal injection is carried out through the pulverized coal injection means which is disposed at intervals around the second oxygen injection means.

5. The scrap melting method of claim 1, wherein the coke is a blast furnace coke.

6. The scrap melting method of claim 5, wherein the blast furnace coke has a size of 20 to 80 mm.

7. The scrap melting method of claim 1, wherein the pulverized coal amount (kg/hour) and the oxygen gas amount (Nm$^3$/hour) have a ratio of at least 0.7 kg/Nm$^3$.

8. The scrap melting method of claim 7, wherein said ratio is at least 1 kg/Nm$^3$.

9. The scrap melting method of claim 1, wherein
   a fuel ratio is at least 300 kg/ton molten iron; and
   a weight ratio of a pulverized coal ratio (kg/ton molten iron) to coke ratio (kg/ton molten iron) is 1 or more, where
   the pulverized coal ratio is an amount of the pulverized coal, which is injected through the burner, per ton molten iron,
   the coke ratio is an amount of the charged coke per ton molten iron, and
   the fuel ratio is a sum of the pulverized coal ratio and the coke ratio.

10. The scrap melting method of claim 9, wherein
    the fuel ratio is from 300 to 500 kg/ton molten iron; and
    the weight ratio of a pulverized coal ratio (kg/ton molten iron) to coke ratio (kg/ton molten iron) is from 1 to 2.5.

11. The scrap melting method of claim 1, wherein the oxygen gas has a purity of 95% or more.

12. The scrap melting method of claim 1, wherein the pulverized coal includes a particle size of 74 μm or less in an amount of 80 wt. % or more.

13. The scrap melting method of claim 1, wherein the oxygen gas injection is carried out through the oxygen injection means surrounding the pulverized coal injection means.

14. The scrap melting method of claim 1, wherein the oxygen gas injection is carried out through the oxygen injection means which is disposed at intervals around the pulverized coal injection means.

* * * * *